(12) United States Patent
Bjorklund, Jr.

(10) Patent No.: US 10,806,132 B2
(45) Date of Patent: Oct. 20, 2020

(54) FISH LURE

(71) Applicant: Richard George Bjorklund, Jr., Mendota Heights, MN (US)

(72) Inventor: Richard George Bjorklund, Jr., Mendota Heights, MN (US)

( * ) Notice: Subject to any disclaimer, the term of this patent is extended or adjusted under 35 U.S.C. 154(b) by 349 days.

(21) Appl. No.: 15/869,887

(22) Filed: Jan. 12, 2018

(65) Prior Publication Data

US 2019/0216068 A1    Jul. 18, 2019

(51) Int. Cl.
| | | |
|---|---|---|
| *A01K 85/00* | (2006.01) |
| *A01K 85/16* | (2006.01) |
| *A01K 95/00* | (2006.01) |
| *A01K 93/00* | (2006.01) |

(52) U.S. Cl.
CPC .............. *A01K 85/16* (2013.01); *A01K 93/00* (2013.01); *A01K 95/00* (2013.01)

(58) Field of Classification Search
CPC ................................. A01K 85/00; A01K 85/16
See application file for complete search history.

(56) References Cited

U.S. PATENT DOCUMENTS

| | | | | |
|---|---|---|---|---|
| 1,710,908 A | * | 4/1929 | Vereecken | A01K 85/16 43/42.34 |
| 1,951,626 A | * | 3/1934 | Pashley | A01K 85/16 43/42.06 |
| 2,617,226 A | * | 11/1952 | Tadaichi | A01K 85/18 43/42.11 |
| 2,659,995 A | | 11/1953 | Hagstrom | |
| 2,736,124 A | * | 2/1956 | Wittmann, Jr. | A01K 85/16 43/42.23 |
| 2,789,385 A | | 4/1957 | Seeger | |
| 2,797,518 A | | 7/1957 | Anderson | |
| 2,817,180 A | * | 12/1957 | Thomas | A01K 85/16 43/42.06 |
| 2,846,805 A | * | 8/1958 | Waitzman | A01K 85/16 43/42.06 |
| 3,041,772 A | | 7/1962 | Laszlo | |
| 3,221,436 A | * | 12/1965 | Mikus | A01K 85/16 43/42.17 |
| 3,895,455 A | * | 7/1975 | Johnston | A01K 85/01 43/17.6 |
| 3,921,328 A | * | 11/1975 | Holcombe | A01K 85/01 43/17.6 |
| 3,973,351 A | | 8/1976 | Doiron | |
| 4,870,776 A | * | 10/1989 | Schock | A01K 85/16 43/42.33 |
| 4,879,832 A | | 11/1989 | Nelson | |
| 4,881,340 A | * | 11/1989 | Davis | A01K 85/16 43/42.06 |
| 5,603,182 A | | 2/1997 | Wilson | |
| 5,870,850 A | * | 2/1999 | Gramse, Jr. | A01K 85/01 43/42.31 |
| 5,934,007 A | * | 8/1999 | Ellestad | A01K 85/16 43/42.06 |
| 2008/0313948 A1 | | 12/2008 | Lewis | |

\* cited by examiner

*Primary Examiner* — Richard G Davis
(74) *Attorney, Agent, or Firm* — Mueting Raasch Group

(57) ABSTRACT

Some examples include a fishing lure including a tubular body extending between a trailing end and a leading end, the leading and trailing ends each include a pair of notches radially spaced from one another, and a fishhook coupled to the trailing end.

18 Claims, 3 Drawing Sheets

FISH LURE

BACKGROUND

This disclosure relates to fish lures used to attract fish as an artificial fishing bait. Fish lures are designed to attract fish and to entice strikes by the fish.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1A:
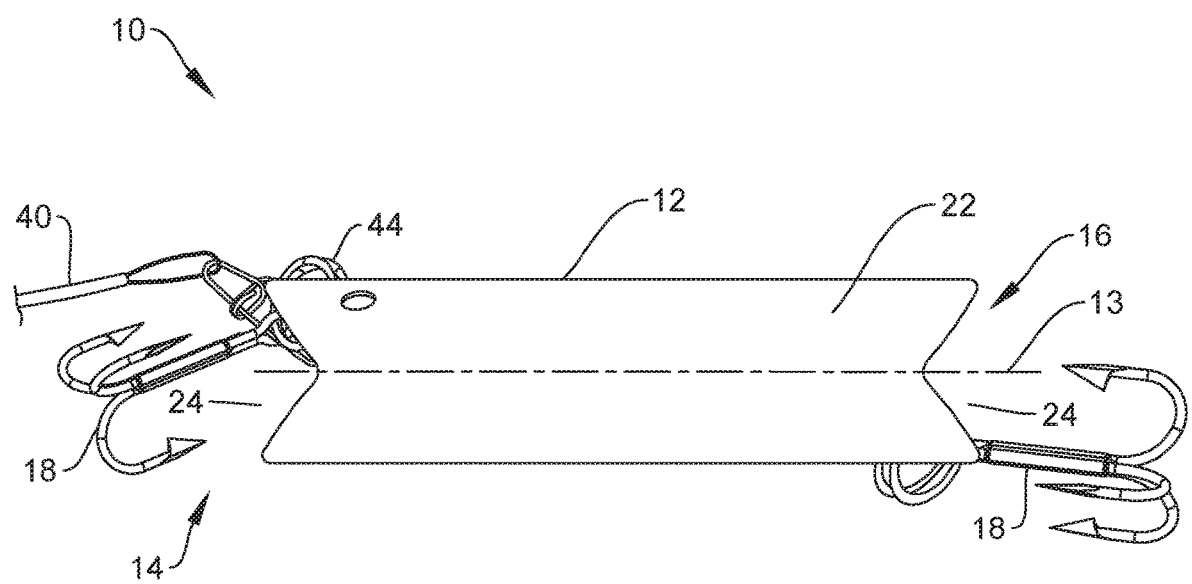
FIGS. 1A and 1B are side and top views of an example fish lure in accordance with aspects of the present disclosure.
Figure 1B:
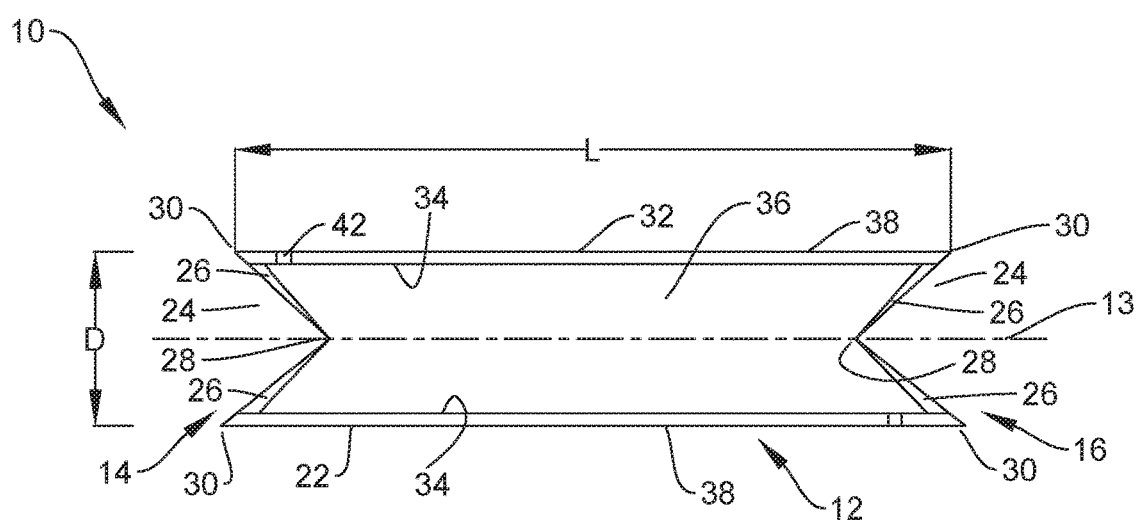
Figure 2A:
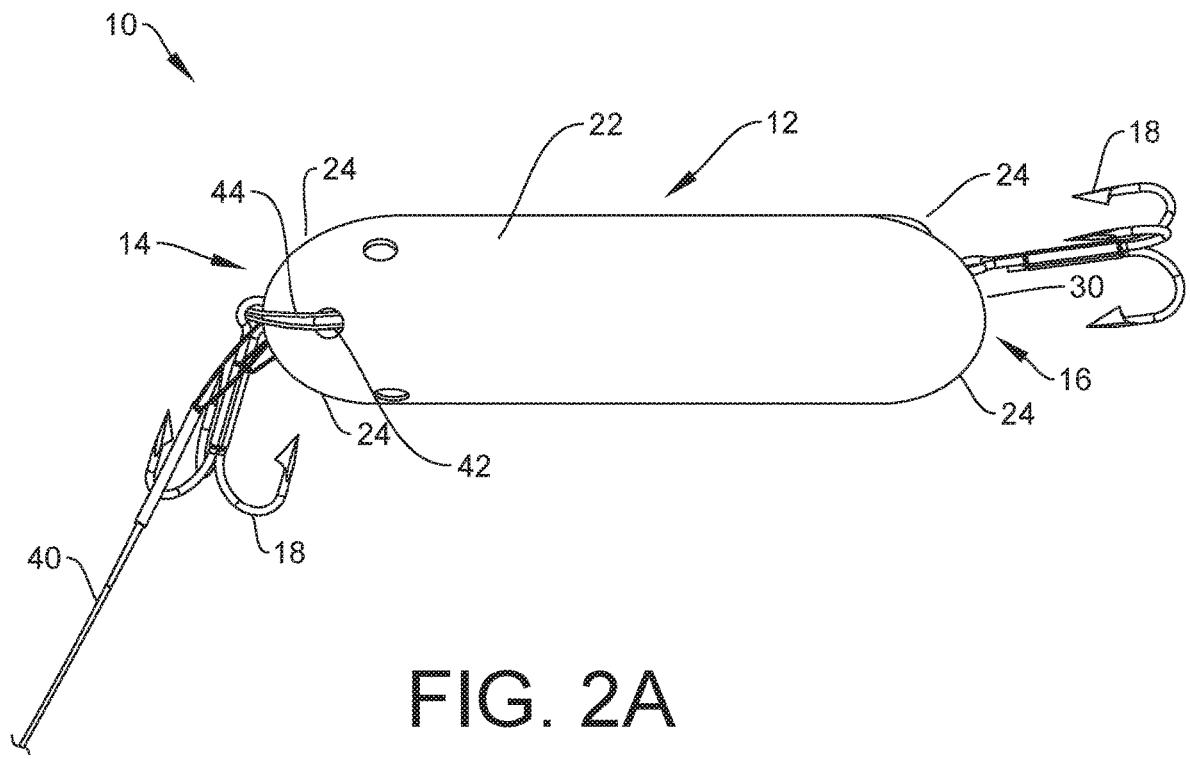
FIGS. 2A and 2B are cross-sectional views of the fish lure illustrated in FIGS. 1A and 1B in accordance with aspects of the present disclosure.
Figure 2B:
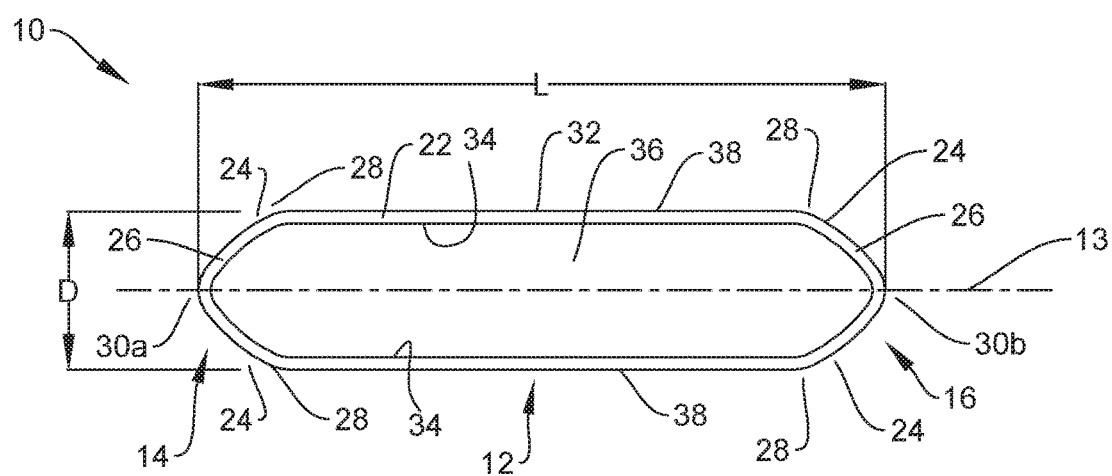

FIGS. 1A and 1B are side and cross-sectional views of an example fish lure 10 in accordance with aspects of the present disclosure. FIGS. 2A and 2B are top and cross-sectional view of an example fish lure 10 in accordance with aspects of the present disclosure. The fish lure 10 has a body 12 extending along a longitudinal axis 13 between a leading end 14 and a trailing end 16. The fish lure 10 includes at least one fishhook 18 coupled to the body 12. The fishhooks 18 are not illustrated in the cross-sectional views of FIGS. 1B and 2B for clarity. The body 12 includes sidewalls 22 extending along a longitudinal axis 13 between the leading end 14 and the trailing end 16. The sidewalls 22 can extend linearly, or substantially linearly, along the longitudinal axis 13. The body 12 can be an elongated cylindrical shape having a circular cross-section perpendicular to a longitudinal axis 13. Other cross-sectional shapes, such oval, for example, can also be acceptable.

Figure 3A:
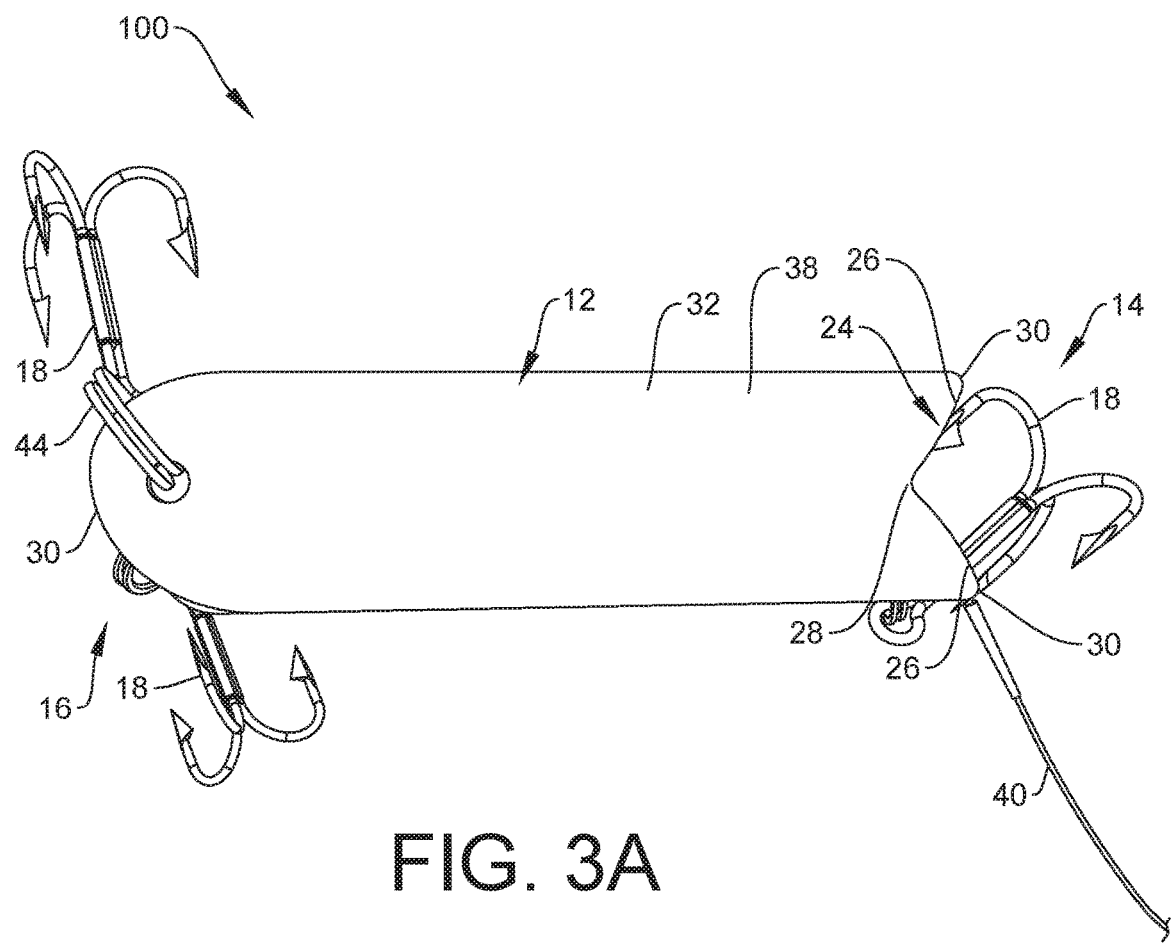
FIGS. 3A and 3B are side and cross-sectional views of another example fish lure in accordance with aspects of the present disclosure.

The trailing and leading ends 14, 16 can include at least one notch 24 formed in the sidewalls 22 at one or both or the leading and trailing ends 14, 16. The notches 24 can be the same or differing sizes and/or circumferential orientations on the opposing leading and trailing ends 14, 16. As illustrated in FIGS. 1A and 1B, in one example, at least one of the leading and trailing ends 14, 16 includes two notches 24 circumferentially spaced 180°, or directly across, from one another. In one example, the notches 24 can be circumferentially aligned on opposing leading and trailing ends 24. In other words, in one example, the notches 24 can be circumferentially oriented the same on each of the opposing leading and trailing ends 14, 16. In another example, fishing lure 100 can include the notches 24 on the trailing end 16 can be circumferentially offset, or rotated, for rotated example 90° (degrees), relative to the notches 24 at the leading end 14, as illustrated in FIGS. 3A and 3B.

The notches 24 can be angled V-shaped notches, the edges 26 forming the V-shape intersecting at an inset 28 extended toward a center portion 32 of the body 12 along the longitudinal axis 13 from a tip 30. The tips 30 can be rounded or tapered, for example. In one example, edges 26 of the notch 24 can be formed as an angular V-shaped groove, intersecting to form an angle inset 28 inverted along the length of the body 12 and extend away from the central portion 32 toward the respective trailing or leading end 14, 16 to join, or intersect, at opposing tips 30. The notches 24, insets 28, and tips 30 can include linear or curved shapes. In one example, the notches 24 at the trailing and leading ends 14, 16, can be configured to represent tail fins and mouth of a bait fish. The leading and trailing ends 14, 16 of the body 12 can be formed into the semblance of a head and tail of a live bait animal, such as a minnow, for example.

Figure 3B:
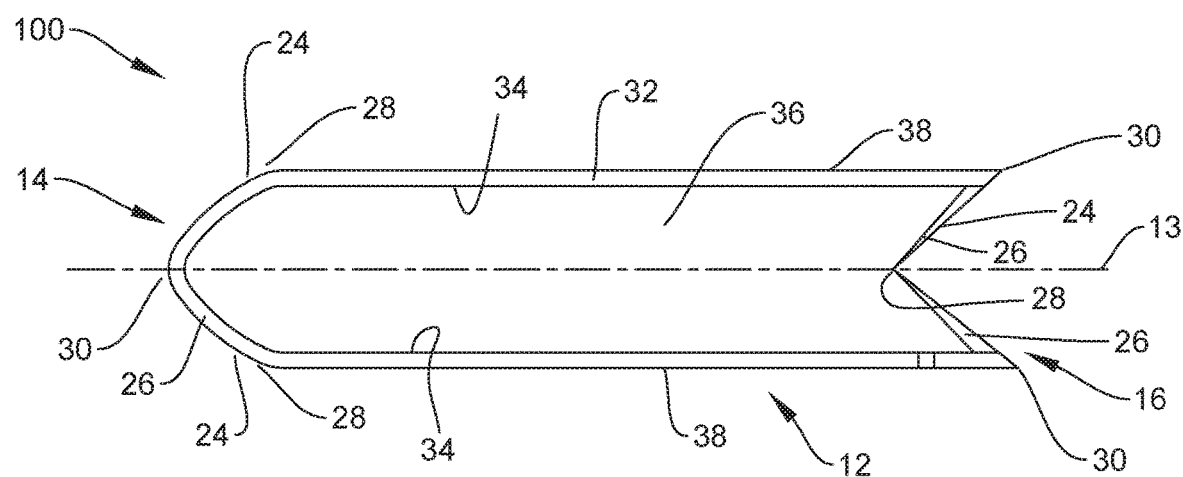

With additional reference to the cross-sectional views of fish lure 10 illustrated in FIGS. 1B, 2B, and 3B, an interior surface 34 of the sidewalls 22 defines an interior cavity 36 of the body 12. The leading and trailing ends 14, 16 can be entirely open throughout the interior cavity 36 defined by the sidewalls 22. In one example, the sidewalls 22 have a constant, or substantially equivalent, thickness between an exterior surface 38 and the interior surface 34 between the trailing and leading ends 14, 16. In one example, the sidewalls 22 at the trailing and leading ends 14, 16 can include edges 26 that are tapered, or beveled, from inwardly the exterior surface 38 toward the interior surface 34. In another example, the sidewalls 22 at the trailing and leading ends 14, 16 can include edges 26 that are tapered, or beveled from interior surface 34 toward exterior surface 38 (not shown). The interior and exterior surfaces 34, 38 can be generally smooth for ease of movement through the air and the water.

The fish lure 10 can be any appropriate size. The body 12 can be formed as a hollow cylinder of a suitable diameter "D". In generally, the body 12 has a length "L", from tip 30a to tip 30b along the longitudinal axis 13 that is greater than a width, or diameter, perpendicular to the longitudinal axis. In one example, the body 12 has a ½ inch diameter. The length "L" can be 3 inches, 4 inches, 5 inches, for example. Other lengths "L" and diameters "D" are also acceptable.

The body 12 can be homogeneous and can be formed of a monolithic, unitary, single piece of material. In one example, the body 12 can be formed of a section of polyvinyl chloride (PVC) tubular pipe. In another example, the body 12 can be formed of a metal or metal-alloy, such as stainless steel or aluminum, for example. The body 12 can be formed of a synthetic plastic polymer, such as PVC, or a multitude of other materials and may be rigid, semi-rigid, or flexible. The body 12 can be formed of a lightweight material that is non-corrosive material in fresh or salt water. The body 12 can be water resistant or water proof. The body 12 is durable and can withstand impact, such as the force of a fish striking or biting at the fish lure, and can be water resistant.

The exterior surface 38 can be uncoated or can be coated with a coating material to provide waterproofing, increased durability, color and other desirable attributes. In one example, the exterior surface 38 is smooth for ease of movement through the air (e.g., during casting) and water. In another example, both the interior and exterior surfaces 34, 36 are smooth. The body 12 can be coated with materials which affect characteristics such as weight, color, durability, water resistance, etc. The interior and exterior surfaces can be coated with an epoxy or paint. The exterior surface 12 can include patterning or other embellishments to provide the appearance of eyes, fins, and/or tail of a live bait animal.

Fishhooks 18 and a fishing line 40 can be coupled to the body 12 in any desired manner. In one example, a fishhook 18 is attached at each of the leading and trailing ends 14, 16. For example, the fishhooks 18 can be mounted adjacent the insets 28 or the tips 30 of one or both of the leading and trailing ends 14, 16. The fishing line 40 can be coupled to the body 12 along the leading end 14. For example, the leading end 14 can include a hole 42, or aperture, extending through the sidewall 22 for attachment of the fishing line 40 (not shown). In one example, the fishing line 40 and the fishhook 18 are coupled to the body 12 at the same location, such as the aperture 42, adjacent to the leading end 14. A ring 44 can be attached through the aperture 42 in the body 12 adjacent the trailing end 16 and/or the leading end 14. The ring 44 can be attached to the body 12 to facilitate attachment of the fishhook 18 and/or fishing line 40.

Any number of fishhooks 18 can be included in different configurations to give an angler a choice of a number of configurations and arrangements. The fishhooks 18 can include single pronged or multi-pronged hooks. For example, the fishhook 18 can be a treble hook having three prongs. The fishhook 18 can be generally J-shaped and includes an eye for attaching the fishhook 18 to the ring and a prong opposite the eye. The fishhooks 18 can be any suitable number and grouping and can be removably secured to the body 12 with suitable attachment means 44, such as rings, for example. The fishhooks 18 can be disposed on the tip 30 of one or both of the leading and trailing ends 14, 16. In one example, the fishhooks 18 can be provided on radially opposing tips 30 of the leading and trailing ends 14, 16. In another example, the fishhooks 18 can be installed on the same radial position on opposing trailing and leading ends 14, 16. In one example, the fish lure 10 includes the fishhook 18 attached along, or adjacent to, the trailing end 16. In one example, the fishhook 18 is included at each of the trailing and leading ends 14, 16 of the cylindrical body 12. More than one fishhook 18 can be included on one or both of the leading and trailing ends 14, 16. In one example, the fishing lure 10 can be a kit with a set of fishhooks 18, rings 44, weights, floats, or other accessories useable with body 12 of fishing lure 10.

The interior cavity, or lumen, 36 of the cylindrical body 12 can be entirely or partially empty. In one example, the interior cavity 36 of the body 12 can contain a floatation material (not shown) to aid in a desired level of floatation or buoyancy of the fish lure 10. The floatation material can be an expandable foam, or rigid insulation, or other suitable material. Alternatively, or additionally, the interior cavity 36 of the body 12 can house a weighted material (not shown) for sinking the lure 10 to a desired water depth. Weighted material can be metal balls, for example. Other materials suitable to provide a desired floatation or weight are also acceptable. The interior cavity 36 can be partially or entirely filled with floatation material and/or weighted material. In one example, the floatation material can extend within the interior cavity along the entire, or substantially entire, length "L" of the body 12.

Fishing lure 10 can be suitable for casting and trolling. During use, a flow of water or air can be through the interior cavity 36 of the body 12 when hollow or partially hollowed along the longitudinal axis 13. The flow of water or air can be also over exterior surface 38 when hollow, partially hollow, or filled across an interior cross-sectional area of the body 12 with floatation material and/or weighted material. Water may flow through and/or around the body 12 of the fishing lure 10 when towed on the fishing line 40 through the water causing it to bob, weave and otherwise move in an active manner to attract fish as bait.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fishing lure, comprising:
a tubular body extending between a trailing end and a leading end, the leading and trailing ends each include a pair of V-shaped notches radially spaced from one another; and
a fishhook coupled to the trailing end.

2. The fishing lure of claim 1, wherein the body is a single monolithic tube extending from the leading end to the trailing end.

3. The fishing lure of claim 1, further comprising:
a second fishhook coupled to the leading end.

4. The fishing lure of claim 1, wherein the notches are radially spaced 180 degrees.

5. The fishing lure of claim 1, wherein the tubular body is linear.

6. The fishing lure of claim 1, further comprising:
a buoyant material disposed within the tubular body.

7. A fishing lure, comprising:
an elongated cylindrical body extending between a leading end and a trailing end, the leading and trailing ends each formed with grooves, wherein each groove comprises a pair of V-shaped notches;
a first fishhook coupled to the leading end; and
a second fishhook coupled to the trailing end.

8. The fishing lure of claim 7, wherein the elongated tubular body is open at the leading and trailing ends.

9. The fishing lure of claim 7, wherein the elongated cylindrical body includes tubular sidewalls terminating at the leading and trailing ends.

10. The fishing lure of claim 7, wherein the elongated cylindrical body is rigid.

11. The fishing lure of claim 7, wherein the elongated cylindrical body is comprised of a synthetic plastic polymer.

12. The fishing lure of claim 7, further comprising:
a weighted body disposed within an interior of the elongated cylindrical body.

13. A fishing lure, comprising:
a tubular body including tubular side walls and open trailing and leading ends, wherein the trailing and leading ends each include a pair V-shaped grooves; and
a fishhook coupled to the trailing end.

14. The fishing lure of claim 13, wherein the V-shaped grooves are equidistantly radially spaced at the leading and trailing ends.

15. The fishing lure of claim 13, further comprising:
a second fishhook coupled to the leading end.

16. The fishing lure of claim 13, wherein the V-shaped grooves include a pair of legs, wherein the legs of the pair of V-shaped grooves extend to meet at a terminal end.

17. The fishing lure of claim 16, wherein the terminal end is rounded.

18. The fishing lure of claim 17, wherein the terminal end is beveled from an interior surface to an exterior surface.

\* \* \* \* \*